United States Patent [19]

Grant

[11] 4,403,720

[45] Sep. 13, 1983

[54] BIDIRECTIONAL TAPE ADVANCING METHOD AND APPARATUS

[75] Inventor: Frederic F. Grant, Bellflower, Calif.

[73] Assignee: Bell & Howell Company, Chicago, Ill.

[21] Appl. No.: 345,971

[22] Filed: Feb. 5, 1982

[51] Int. Cl.³ .................. B65H 59/38; G03B 1/04; G11B 15/32

[52] U.S. Cl. .................. 226/190; 226/194; 226/196

[58] Field of Search .............. 226/189, 190, 194, 196, 226/21; 57/344, 346, 352, 135

[56] References Cited

U.S. PATENT DOCUMENTS

| | | | |
|---|---|---|---|
| 3,015,932 | 1/1962 | McCard | 57/346 |
| 3,035,402 | 5/1962 | Westall et al. | 57/135 |
| 3,140,033 | 7/1964 | Zivny | 226/196 |
| 3,285,610 | 11/1966 | Shields | 274/4 |
| 3,315,859 | 4/1967 | Owen et al. | 226/21 |
| 3,414,339 | 12/1968 | Hay | 308/26 |
| 3,608,796 | 9/1971 | Morse et al. | 226/194 X |
| 3,658,227 | 4/1972 | Stephens | 226/196 |
| 3,662,937 | 5/1972 | Borman | 226/89 |
| 3,854,646 | 12/1974 | Dorfel et al. | 226/191 |
| 3,949,919 | 4/1976 | Takei | 226/196 |
| 4,091,979 | 5/1977 | Browder | 226/196 X |
| 4,148,464 | 4/1979 | Fog et al. | 254/150 FH |
| 4,150,773 | 4/1979 | Fell et al. | 226/196 |
| 4,231,504 | 11/1980 | Ketzer | 226/180 |

*Primary Examiner*—Leonard D. Christian
*Attorney, Agent, or Firm*—Benoit Law Corporation

[57] ABSTRACT

Methods and apparatus for guiding an advancing tape in either one of two opposite directions employ a hollow tape guide member, a post through such hollow tape guide member, a sleeve around such post inside the hollow tape guide member, and a tape guide surface at an end of the tape guide member peripherally thereof and at an angle thereto. A fulcrum extends circumferentially around the post at a predetermined location offset in a direction away from the tape guide surface from a central location corresponding to a longitudinal center line of the tape, for supporting the sleeve for omnidirectional tilting motion relative to a plane intersecting the post at the predetermined location. The hollow tape guide member is mounted on the sleeve with spaced bearings located at opposite sides of the mentioned plane, for rotation about the post and tilting motion with the sleeve. The advancing tape is placed into continuous contact with the tape guide surface by contacting the tape guide member continuously with the advancing tape to rotate and tilt such tape guide member with the tape in either direction of advance.

14 Claims, 3 Drawing Figures

U.S. Patent
Sep. 13, 1983
4,403,720
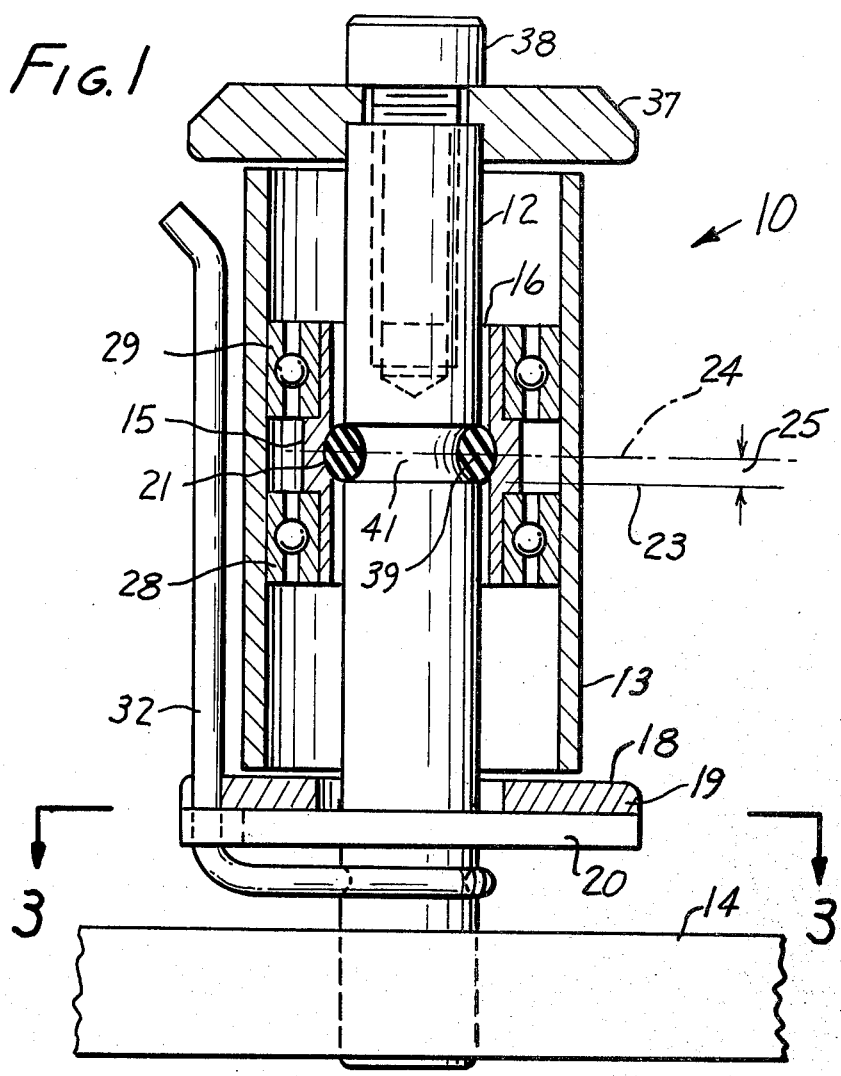
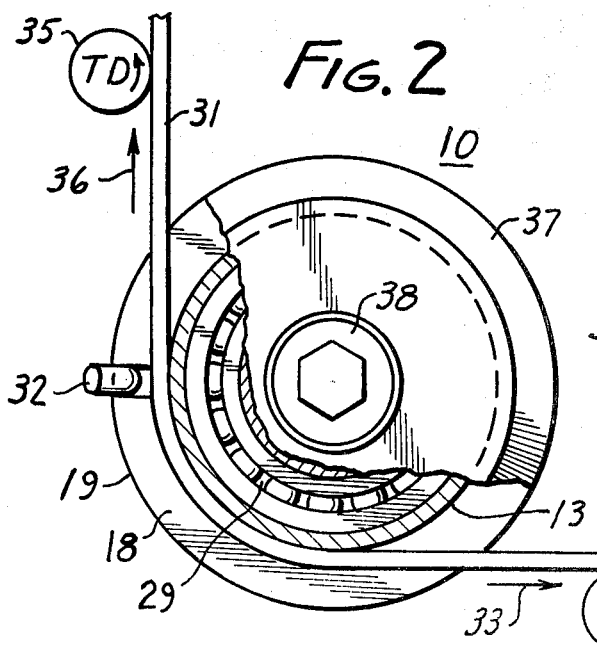
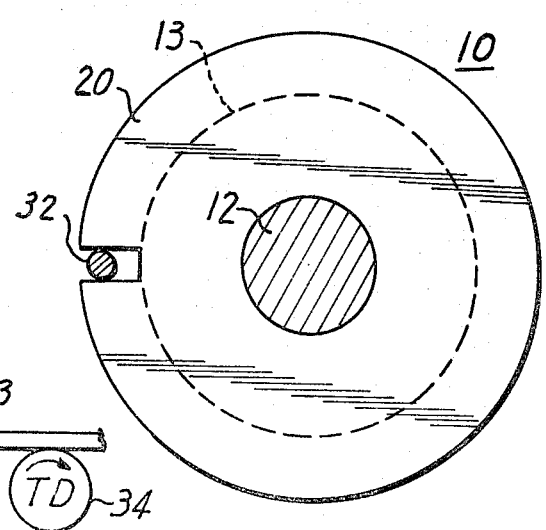

BIDIRECTIONAL TAPE ADVANCING METHOD AND APPARATUS

BACKGROUND OF THE INVENTION

1. Field of the Invention

The subject invention relates to methods and apparatus for guiding an advancing tape and, for instance, has utility in magnetic tape transporst, photographic film handling apparatus and other tape and web transporting or handling equipment wherein a precision guidance of a tape, film or other web is required.

2. Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

Various tape guides and similar devices with tiltable members have become known. For instance, U.S. Pat. No. 3,140,033, by J. C. Zivny, issued July 7, 1964 shows a tape tension equalizer with tiltable guide member. U.S. Pat. No. 3,608,796, by J. E. Morse et al, issued Sept. 28, 1971 shows a web-supporting roller rotatably mounted on a longitudinal shaft and pivotally movable about a gimbal axis relative to such shaft to compensate for misalignment of the advancing web, and U.S. Pat. No. 3,658,227, by J. F. Stephens, issued Apr. 25, 1972 for a tape guide spindle having an inner sleeve fixed in position on a shaft and an outer sleeve held in spaced relationship to the inner sleeve by an O-ring of resilient material permitting the outer sleeve to tilt for accommodating tape approaching the outer sleeve out of proper alignment. In all these prior proposals, the pivot axis or fulcrum is located midway of the tape guide, whereby the guiding function proceeds somewhat arbitrarily without strict reference to a laterally exact position of tape travel.

Against that background, a more advanced proposal is apparent from the subject assignee's U.S. Pat. No. 4,091,979, by L. B. Browder, issued May 30, 1978 for methods and apparatus for precision guiding a web; special reference being made to FIGS. 2 and 3 thereof, showing a system for precision guiding a web against a reference surface spaced from the tiltable tape guide member. While claims in that patent are generic to the improvement disclosed therein, as well as to the invention herein disclosed, the subject invention constitutes a substantial advance over that prior system, which provided web guidance in only one direction of web travel, while arresting such guidance for reverse web travel.

In the course of a novelty search based on the subject disclosure, several patents were found, none of which, however, presented a solution to the problems expressed or implicit herein, as may be seen from the following.

U.S. Pat. No. 1,834,914, by G. R. Goff, issued Dec. 1, 1931, discloses a bobbin clutching spindle and clutched bobbin having circumferential rings around a lower portion of the periphery thereof. U.S. Pat. No. 3,015,932, by H. W. McCard, issued Jan. 9, 1962 discloses a twister head for textiles having O-rings around outer races of two bearings for elastomeric suspension. U.S. Pat. No. 3,035,402, by A. Westall et al, issued May 22, 1962 discloses textile spinning spindles with spaced journal and footstep bearings. U.S. Pat. No. 3,285,610 by G. B. Shields, issued Nov. 15, 1966 discloses a magnetic recorder cartridge lockdown mechanism in which a pinch roller is mounted on a shaft having an annular, spherical protrusion permitting wobbling self-adjustment of the pinch roller in alignment with a capstan shaft. U.S. Pat. No. 3,315,859, by W. S. Owen et al, issued Apr. 25, 1967 discloses a web tracking mechanism having a web guide roller pivotally supported on a shaft by means of a spherical inner race located on the shaft and a pair of annular outer races interposed between such inner race and the inner periphery of the roller. U.S. Pat. No. 3,414,339, by R. B. Hay, issued Dec. 3, 1968 discloses an oil-free bearing assembly in which O-rings are squashed between a bearing sleeve and bearing housing to form a friction fitting.

U.S. Pat. No. 3,588,204, by V. V. Abashkin et al, issued June 28, 1971 discloses an axle-box for rolling stock employing a pair of roller bearings. U.S. Pat. No. 3,662,937, by M. P. Borman, issued May 16, 1972 discloses a magnetic tape cartridge having self-aligning tape guide and pressure rollers supported on generally spherical steel balls mounted on a shaft, and complementary outer races extending to the inner wall of the tape guide or pressure roller. U.S. Pat. No. 3,788,437, by J. W. A. Camp, issued Jan. 29, 1974 discloses a self-centering clutch release bearing assembly supported for limited radial movement and spring-biased into engagement with a bearing carrier. U.S. Pat. No. 3,854,646, by Dörfel et al, issued Dec. 17, 1974 discloses a pressure-balanced guide roller assembly employing multiple bearing units. U.S. Pat. No. 3,949,919, by Y. Takei, issued Apr. 13, 1976 discloses a capstan assembly with spaced self-aligning capstan bearings, each having an outer convex surface received in corresponding retainers. U.S. Pat. No. 4,148,464, by E. Fog et al, issued Apr. 10, 1979 discloses a hydraulic motor fastened within a pulley with the aid of elastomeric seals and a bearing associated therewith.

Another tape guide roller employed primarily at helical video tape scanners employed a single no-preload ball bearing between a post and the inner surface of a hollow-cylindrical tape guide member having a tape guide surface located circumferentially at one end of the rotating tape guide member. The roller bearing is laterally offset in a direction away from the tape guide surface from a central location corresponding to a longitudinal center line of the advancing tape.

Accordingly, the advancing tape is guided into and in engagement with the tape guide surface under the influence of a tilting motion of the tape guide member due to the presence and operation of the mentioned ball bearing. At high tape speeds the performance of that type of tape guide deteriorated in running characteristics and smoothness and the mentioned single-bearing principle did not prove suitable for high-speed operation.

SUMMARY OF THE INVENTION

It is an object of this invention to overcome the disadvantages and meet the needs expressed or implicit in the above disclosure statement and in other parts hereof.

It is a germane object of this invention to provide improved methods and apparatus for guiding an advancing tape.

It is a related object of this invention to provide improved methods and apparatus for guiding an advancing tape in either one of two opposite directions.

It is also an object of this invention to increase permissible tape speed in tape guiding methods and apparatus.

Other objects of this invention will become apparent in the further course of this disclosure.

From a first aspect thereof, the subject invention resides in a method of guiding an advancing tape in either one or two opposite directions, with a hollow tape guide member and a tape guide surface. The invention according to this aspect resides, more specifically, in the improvement comprising, in combination, the steps of or means for, providing a post for supporting the hollow tape guide member, providing a sleeve around that post inside the hollow tape guide member, extending the tape guide surface at an end of the tape guide member peripherally thereof and at an angle thereto, providing a fulcrum circumferentially around the post at a predetermined location offset in a direction away from the tape guide surface from a central location corresponding to a longitudinal center line of the tape, for supporting the sleeve for omnidirectional tilting motion relative to a plane intersecting the post at the predetermined location, mounting the hollow tape guide member on the sleeve with spaced bearings located at opposite sides of said plane, for rotation about the post and tilting motion with the sleeve, and placing the advancing tape into continuous contact with the tape guide surface by contacting the tape guide member continuously with the advancing tape to rotate and tilt such tape guide member with the tape in either direction of advance of the tape.

From another aspect thereof, the subject invention resides in apparatus for guiding an advancing tape in either one of two opposite directions, comprising, in combination, a hollow tape guide member, a post through that hollow tape guide member, a sleeve around the post inside the hollow tape guide member, a tape guide surface at an end of the tape guide member peripherally thereof and at an angle thereto, means for supporting the sleeve for omnidirectional tilting motion relative to a plane intersecting the post at a predetermined location offset in a direction away from the tape guide surface from a central location corresponding to a longitudinal centerline of the tape, including means for providing a fulcrum circumferentially around the post at the offset predetermined location, and means for mounting the hollow tape guide member on the sleeve, including spaced bearings located at opposite sides of the mentioned plane.

BRIEF DESCRIPTION OF THE DRAWINGS

The subject invention and its various objects and aspects will become more readily apparent from the following detailed description of preferred embodiments thereof, illustrated by way of example in the accompanying drawings, in which like reference numerals designate like or functionally equivalent parts, and in which:

FIG. 1 is an elevation, partially in section, of a bidirectional tape guiding apparatus according to a preferred embodiment of the subject invention;

FIG. 2 is a top view, partially in section of the tape guiding apparatus of FIG. 1; and FIG. 3 is a section taken on the line 3—3 in FIG. 1.

DESCRIPTION OF PREFERRED EMBODIMENTS

The bidirectional tape guiding apparatus 10 according to a preferred embodiment of the subject invention, illustrated in the drawings, has a post 12 for supporting a hollow tape guide member 13. In FIG. 1, the post 12 is shown as attached to and extending vertically from a baseplate 14. However, it should be understood that the post may extend horizontally or at any other angle and may, if desired, have the form of, or be replaced by, a shaft or similar device.

The subject invention provides a sleeve 15 around the post 12 inside the hollow tape guide member 13. A clearance 16 between the post 12 and the sleeve 15 permits tilting motion of such sleeve relative to the post. In the illustrated preferred embodiment, the sleeve 15 has an inside diameter larger than the outside diameter of the post, at least in the region of the sleeve 15.

A tape guide surface 18 extends at an end of the tape guide member 13 peripherally thereof and at an angle thereto. In principle, the tape guide surface 18 could be part of a flange of the tape guide member 13, being rotatable therewith. However, according the the preferred embodiment, the tape guide surface 18 is located on a disk or washer-like member 19 which extends radially from the post 18 adjacent one end of the tape guide member 13. The post 12 has a radial flange 20 on which the disk 19 is located. In practice, the disk 19 with its tape guiding surface 18 may be a layer or stratum of ceramic or other hard material on the supporting flange 20.

The subject invention provides a fulcrum 21 circumferentially around the post 12 at a predetermined location offset in a direction away from the tape guide surface 18 from a central location corresponding to a longitudinal center line of the tape. In FIG. 1, the latter central location is indicated by a phantom line 23 as being midway between the upper and lower ends of the rotatable tape guide member 13. On the other hand, the predetermined offset location of the circumferential fulcrum 21 is indicated by a phantom line 24, and it is seen from FIG. 1 that there is a distance or offset 25 between the phantom lines 23 and 24 or, in other words, between the mentioned central location at 23 and predetermined location at 24. As indicated, such offset 25 points away from the tape guide surface 18, rather than toward it, as in the above mentioned Browder patent.

The circumferential fulcrum 21 supports the sleeve for omnidirectional tilting motion relative to a plane intersecting the post 12 at the mentioned predetermined location at 24.

The hollow tape guide member 13 is mounted on the sleeve 15 with spaced bearings 28 and 29 located, respectively, below and above or, in other words, at opposite sides of, the mentioned plane at 24.

The bearings 28 and 29 mount the hollow tape guide member 13 for rotation about the post 12 and tilting motion with the sleeve 15. This provides a significant difference over the above mentioned existing tape guide structure which employed a ball bearing for tilting motion of a rotating tape guide member relative to a shaft or post.

In the tape guide according to the subject invention, it is the circumferential fulcrum 21 that enables the desired tilting motion, and not the bearings 28 and 29. Also, contrary to the above mentioned existing guide structure, the subject invention does not mount either of the bearings 28 and 29 directly on the post 12, but rather provides the tiltable sleeve 15 on which the bearings 28 and 29 are mounted.

Moreover, neither of the bearings 28 and 29 need to provide any tilting action of itself. In fact, the bearings 28 and 29, according to a preferred embodiment of the subject invention, are preloaded or provided with a ball cage (not shown), as necessary to avoid liberty for tilting motion between the races of these bearings. Also, roller or needle bearings may be employed instead of preloaded ball bearings.

In practice, the tape 31 is placed into contact with the rotatable tape guide member 13. A clip or similar device 32 may be employed to releasably retain the tape 13 in the vicinity of the guide 13. The clip 23 may be attached to the post 12 as seen in FIG. 1 and may have a main portion running parallel to the post 12 or guide member 13.

The tape 31 may be advanced in the direction of an arrow 33 by a first tape drive 34 (TD), as seen in FIG. 2. Alternatively, the tape 31 may be advanced in an opposite direction 36 by a second tape drive 35 (TD). In practice, tape drive capstans may be provided at 34 and 35 to be driven alternatively by one and the same switchable tape drive mechanism in opposite senses of rotation.

On the other hand, one of the tape drivers 34 and 35 may be a capstan drive, while the other may be a reel drive for such operations as fast forward and fast rewind of the tape 31. Also, the system herein disclosed may advantageously be used in, for instance, a magnetic tape transport, in which the tape 31 is advanced at great precision in engagement with and past one or more multi-track recording and playback heads or a slant-track video tape scanner.

For highest precision, and avoidance of crosstalk between recording tracks on the tape, the advancing tape 31 is placed into continuous contact with the tape guide surface 18 by contacting the tape guide member 13 continuously with the advancing tape to rotate and tilt such tape guide member 13 with the tape 31 in either direction of advance 31 and 36 of that tape. Because of the circumferential fulcrum 21 and its offset 25, the tape 31 will thereby apply itself laterally to the tape guide surface 18 with a desired force proportional to the amount of the offset 25. In practice, the illustrated arrangement forms an equal and opposite couple balancing the forces acting on the tape from the circumferential fulcrum 21 and offset 25 and from the guide surface 18.

In the illustrated embodiment, the post 12 carries an upper end cap 37, which is attached thereto by an axial screw 38. The rotatable tape guide member 13 is spaced from both the tape guide surface 18 at one end and the end cap 37 at the other.

The circumferential fulcrum 21 may be provided by an elastomeric O-ring 39 sitting in a peripheral external groove 41 of the post 12 and in a corresponding annular internal groove of the sleeve 15 at the offset location 24.

The elastomeric O-ring 39 may be compressed by the sleeve 15 into contact with the post 12 or may otherwise be employed for imposing a resilient bias on the sleeve 15 at the circumferential fulcrum 21, for restoration of the sleeve to a desired position, such as the illustrated mid-position, after a tilting motion imposed by the advancing tape 31. In this respect, the sleeve 15 and tape guide member 13 are tilted with the advancing tape 31 against the resilient bias provided by the O-ring 39.

The fulcrum 21 may thus be provided by extending a flexible or resilient member around the post 12 in contact with such post and the sleeve 15. In practice, flexible or reilient members other than the O-ring 39 may be employed for such purpose.

As seen in FIG. 1, the O-ring 39 and sleeve 15 are provided with complementary curvatures. In the illustrated embodiment, the sleeve 15 has the above mentioned internal groove at 24 while the O-ring 39 axially extends into such groove.

Within the broad contemplation of the subject invention, ball and socket combinations of the type shown in the above mentioned Owen et al and Borman patents may be employed to provide the desired circumferential fulcrum 21, with the ball or spherical part in such combination taking, for instance, the place of the O-ring 39, and the complementary split bushings being located in the sleeve 15.

The above mentioned resilient bias at the fulcrum 21 may then be avoided, as desired or necessary.

As seen in the drawings, the tape guide member 13 may be hollow-cylindrical. On the other hand, an external taper may be imposed on the rotary tape guide member 13. Such taper may, for instance, have its base located adjacent the tape guiding surface 18 and may extend at a diminishing diameter away from such tape guiding surface, in order to urge the advancing tape 31 into contact with the tape guide surface 18.

Such tape guide surface 18 may be extended circumferentially about the tape guide member 13, as seen, for instance, in FIG. 1 with the aid of FIGS. 2 and 3.

As mentioned above, the methods and apparatus of the subject invention operate bidirectionally in both directions of tape advance 33 and 36. In particular, the advancing tape 31 tilts the tape guide member 13 for contact with the tape drive surface 18 and resulting high-precision tape guidance, whether the tape advances in the direction 33 or in the direction 36.

Despite this bidirectional tape guiding capability, the tape guide methods and apparatus of the subject invention may, within the scope thereof, also be employed in installations or tape transports in which tape travel in only one direction 33 or 36 is desired. As far as tape transports are concerned, the tape may be precision guided relative to magnetic recording and playback equipment, such as a single or multi-track recording and playback heads or a helical or transverse tape scanner.

The subject extensive disclosure will suggest and render apparent to those skilled in the art various modifications and variations within the spirit and scope of the subject invention and equivalents thereof.

We claim:

1. In a method of guiding an advancing tape in either one of two opposite directions with a hollow tape guide member and a tape guide surface, the improvement comprising in combination the steps of:

providing a post for supporting said hollow tape guide member;

providing a sleeve around said post inside said hollow tape guide member;

extending said tape guide surface at an end of said tape guide member peripherally thereof and at an angle thereto;

providing a fulcrum circumferentially around said post at a predetermined location offset in a direction away from said tape guide surface from a central location corresponding to a longitudinal center line of said tape, for supporting said sleeve for omnidirectional tilting motion relative to a plane intersecting said post at said predetermined location;

mounting said hollow tape guide member on said sleeve with spaced bearings located at opposite sides of said plane, for rotation about said post and tilting motion with said sleeve; and placing said advancing tape into continuous contact with said tape guide surface by contacting said tape guide member continuously with said advancing tape to rotate and tilt said tape guide member with said tape in either direction of advance of said tape.

2. A method as claimed in claim 1, including the steps of:

imposing a resilient bias on said sleeve at said circumferential fulcrum; and tilting said sleeve and tape guide member with said advancing tape against said resilient bias.

3. A method as claimed in claim 1 or 2, including the step of:

providing said fulcrum by extending a flexible member around said post in contact with said post and said sleeve.

4. A method as claimed in claim 1 or 2, wherein:

said provision of a fulcrum includes the step of extending an annular member around said post and providing said annular member and sleeve with complementary curvatures.

5. A method as claimed in claim 1 or 2, wherein:
said tape guide member is made hollow-cylindrical.

6. A method as claimed in claim 1 or 2, wherein:
said tape guide surface is extended circumferentially about said tape guide member.

7. A method as claimed in claim 1 or 2, wherein:
said tape guide surface is maintained stationary relative to said tape guide member.

8. Apparatus for guiding an advancing tape in either one of two opposite directions, comprising in combination:

a hollow tape guide member;

a post through said hollow tape guide member;

a sleeve around said post inside said hollow tape guide member;

a tape guide surface at an end of said tape guide member peripherally thereof and at an angle thereto;

means for supporting said sleeve for omnidirectional tilting motion relative to a plane intersecting said post at a predetermined location offset in a direction away from said tape guide surface from a central location corresponding to a longitudinal center line of said tape, including means for providing a fulcrum circumferentially around said post at said offset predetermined location; and means for mounting said hollow tape guide member on said sleeve, including spaced bearings located at opposite sides of said plane.

9. Apparatus as claimed in claim 8, including:

means for imposing a resilient bias on said sleeve at said circumferential fulcrum for restoration of said sleeve to a desired position after said tilting motion.

10. Apparatus as claimed in claim 8 or 9, wherein:
said means for providing a fulcrum include a resilient member extending around said post between said post and said sleeve.

11. Apparatus as claimed in claim 8 or 9, wherein:
said means for providing a fulcrum include an annular member around said post having a curved outer surface and a curvature inside said sleeve complementary with said curved outer surface.

12. Apparatus as claimed in claim 8 or 9, wherein:
said tape guide member is hollow-cylindrical.

13. Apparatus as claimed in claim 8 or 9, wherein:
said tape guide surface extends circumferentially about said tape guide member.

14. A method as claimed in claim 8 and 9, including:
means for maintaining said tape guide surface stationary relative to said tape guide member.

* * * * *